June 4, 1968     H. W. WYCKOFF     3,386,876
NON-WOVEN NET MANUFACTURE
Filed June 2, 1961     2 Sheets-Sheet 1
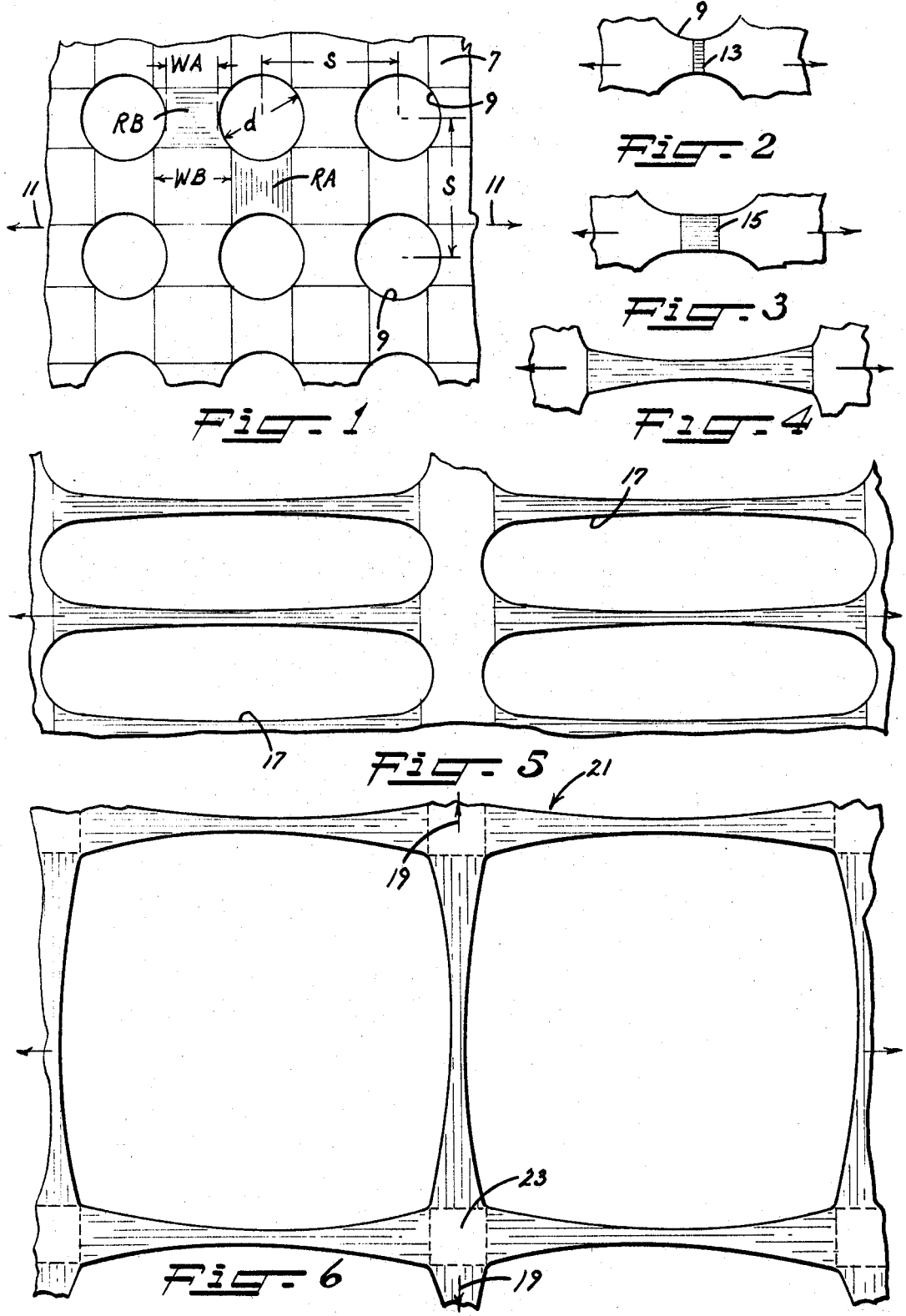

June 4, 1968 H. W. WYCKOFF 3,386,876
NON-WOVEN NET MANUFACTURE
Filed June 2, 1961 2 Sheets-Sheet 2

United States Patent Office 3,386,876
Patented June 4, 1968

3,386,876
NON-WOVEN NET MANUFACTURE
Harold W. Wyckoff, Middletown Township, Delaware County, Pa., assignor, by mesne assignments, to Avisun Corporation, Philadelphia, Pa., a corporation of Delaware
Filed June 2, 1961, Ser. No. 114,476
16 Claims. (Cl. 161—109)

The present invention relates to the manufacture of reticulated structures and particularly non-woven nets and like structures from thermoplastic polymeric materials.

An object of this invention is to provide a reticulated structure of thermoplastic polymeric material which includes a plurality of uniaxially drawn or oriented elements or ribs connected by undrawn junctures.

Another object is to provide a method for making a reticulated structure wherein a film of thermoplastic polymeric material is treated in accordance with a predetermined pattern and then stretched along at least one of its axes to uniaxially draw the elements or ribs between the treated areas while leaving junctures between such ribs in an undrawn condition.

Still another object is the provision of a method for making a non-woven net wherein a film of thermoplastic polymeric material is provided with a predetermined pattern of openings and then stretched along at least one of its axes to form uniaxially drawn elements or ribs connected by undrawn junctures.

The terms "elements" and "ribs" as employed throughout the description and claims refer to those portions of polymeric material remaining between the treated areas or openings of a perforated film of polymeric material which are actually or are capable of being uniaxially drawn in accordance with the method of the present invention. Further, the term "drawn" is intended to mean that orientation of the molecules of polymeric material is achieved by the application of a stretching force, with the molecular orientation being generally parallel to the direction of the applied force. As more fully explained hereafter, drawing of the treated or perforated film of thermoplastic polymeric material may be effected along one or both of its longitudinal and transverse axes, either in independent stages or simultaneously, using conventional cold or hot drawing methods and apparatus which are suitable for the particular polymeric material from which the film is formed.

The above noted and other objects and advantages of the present invention will become more apparent from the following description and drawing relating thereto in which:

FIGURE 1 is a top view of a portion of an unoriented thermoplastic polymeric film which has been perforated in accordance with the present invention preparatory to stretching of the same;

FIGURE 2 is a fragmentary view of one of the ribs of the film shown in FIGURE 1 as it initially yields under a stretching load;

FIGURE 3 is a view similar to FIGURE 2, illustrating a rib during an intermediate stage of the drawing thereof;

FIGURE 4 is also a view similar to FIGURE 2, showing a rib drawn to substantially its maximum extent;

FIGURE 5 is a top view of the film shown in FIGURE 1 after being stretched along one of its axial directions;

FIGURE 6 is a top view of the film shown in FIGURE 1 after being biaxially stretched;

Figure 7:
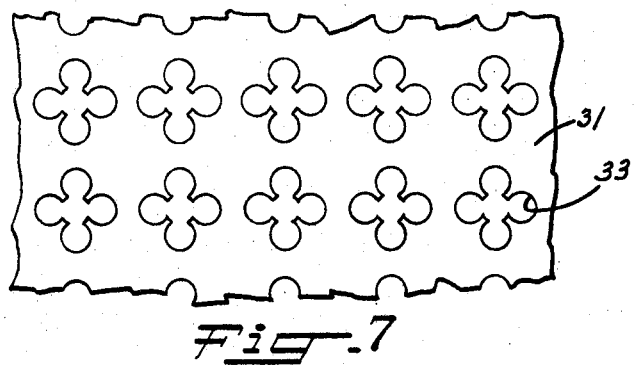
FIGURE 7 is a view similar to FIGURE 1 showing a portion of an unoriented thermoplastic polymeric film having openings of clover-leaf configuration.

In general, the reticulated structure or web of the present invention includes a plurality of ribs, at least certain of which are uniaxially oriented and separated from adjacent ribs by undrawn film areas. The oriented ribs possess maximum strength along the direction in which the molecules thereof are oriented, while the undrawn film areas between the ends of adjacent noncolinear ribs assist in confining the applied drawing forces to the intended ribs and serve to arrest forces which tend to tear the finished web during use.

Broadly, the method of the present invention includes the steps of providing an unoriented film of thermoplastic polymeric material with a predetermined pattern of openings, or specially treated areas as more fully discussed hereafter, and then stretching of such film to uniaxially orient selected ribs thereof. While some latitude is permitted in the shape and spacing of the openings initially formed in the film and the forces applied during stretching, these factors are regulated to restrict orientation to only selected areas of the film, and more specifically, to insure that the oriented ribs terminate at or are connected by undrawn film portions or junctures.

During the stretching operation, the ribs of the perforated film are progressively oriented in the direction of the applied stretching force or forces; that is, with uniaxial drawing in each successive group of parallel ribs occurring simultaneously and extending to a predetermined degree along such ribs before drawing starts in an adjacent groups of ribs in series therewith. To insure proper stretching, two basic requirements must be met as follows: (1) ribs which are to draw in parallel with each other must be capable of being drawn to substantially the same amount, and (2) ribs which are to be drawn in series with each other must be of comparable cross-section so that stretching will be initiated in a group of undrawn ribs after drawing is completed in an adjacent group of ribs and before such drawn ribs are stretched beyond their breaking point or a predetermined point compatible with other drawing which is to be or has been accomplished.

The relationship between the spacing and size and/or shape of the openings in the film is of critical importance from the standpoint of isolating the effects of the stretching forces to the ribs themselves so that undrawn junctures remain between the uniaxially drawn ribs. Basically, the configurations of the openings formed in the film of polymeric material are such that each rib has a narrow part and is of greater width at the areas adjacent to the junctures between ribs. Thus, as such rib is subjected to a stretching force, the narrow part thereof yields initially after which drawing of the rib continues progressively in opposite directions therefrom. As the rib is being drawn along its wider portions, the force necessary to maintain this drawing action progressively increases until it equals and exceeds the force under which an undrawn rib in series therewith yields and starts to stretch.

In accordance with the present invention, each group of parallel ribs is drawn to a predetermined degree before another group of undrawn ribs in series therewith starts to yield. The degree to which the ribs of each group of parallel ribs are drawn during this stage may be such as to stretch the ribs to their maximum allowable extent; that is, without inducing stretching in the junctures between the ends of adjacent ribs. Alternatively, such ribs may be only partially drawn during this stage and may be further drawn to their maximum allowable extent after partial stretching is completed in all such groups of parallel ribs. Once the maximum allowable stretch is induced in each of such ribs, the line defining the end of a drawn rib, hereafter referred to as the "draw-line," will have approximately the maximum length possible without having the juncture between the ends of adjacent ribs stretch and without having the draw-line of one rib interfere or cross with the draw-lines of other ribs at such juncture. The load required to achieve such draw-line of optimum length must be less than the breaking load of ribs which are fully drawn so that substantially complete orientation can be effected in the ribs undergoing stretch. Further, when a single stretching operation is employed for inducing the maximum allowable stretch in the individual ribs, the drawing load required to achieve this result is preferably slightly greater than the yield load of an undrawn rib in series therewith so that such undrawn rib will stretch before drawing extends into the film junctures.

When considering a typical force-elongation curve of a uniform strip of one specific thermoplastic polymeric film under cold drawing conditions, as for example a film formed of polypropylene, the yield load or the load necessary to initiate stretching of the strip will generally be about 1.4 times as great as the draw load or the load required to maintain drawing once such strip has yielded, while the breaking load of a drawn strip will be approximately twice the draw load. As hereafter employed throughout the description and claims the terms "yield load," "draw load," and "breaking load" refer respectively to the loads required for initiating, maintaining, and rupturing the ribs at their narrowest section. Thus with ribs of proper shapes, drawing of the series of groups of parallel ribs will be self-regulating in that drawing will be initiated in one group of parallel ribs when the load applied to an adjacent series of such ribs is approximately 1.4 times the draw load. When such ribs are subjected to only a single stretching operation, the maximum allowable draw will be achieved when the applied load is equal to approximately 1.4 times the draw load. Maximum orientation of the polymer molecules is achieved, however, when the load applied to the ribs approaches the breaking load. Thus, where ribs of optimum strength are desired, stretching is effected in two stages, as heretofore mentioned, with the applied load being equal to about 1.4 times the draw load during the initial stretching operation and approximately or slightly less than twice the draw load during the final stretching operation.

As heretofore mentioned, these desired self-regulating conditions and optimum stretch characteristics are obtained by shaping the ribs so that each has a narrow part and widens out at the junctures between the ends of adjacent ribs. Preferably, the ratio of the widest parts of the rib, at which a draw-line of maximum length is obtained, to the narrowest part thereof, hereafter referred to as the width ratio, should be substantially equal to or slightly greater than the ratio of the yield load to the draw load. With a width ratio which exceeds the yield to draw load ratio, less than maximum orientation will be imparted to a rib being stretched during an initial stretching operation when a rib in series therewith starts to yield. As heretofore mentioned and more fully discussed hereafter such conditions are desired and necessary when drawing of the ribs to their maximum allowable extent is to be effected by two independent stretching operations. On the other hand, if the width ratio of the rib is substantially less than the yield to draw load ratio, drawing of one rib will continue into the juncture between the ends of adjacent ribs before yielding is initiated in an undrawn rib in series therewith.

To satisfy the above noted requirements, it will be apparent that the spacing and size and/or shape of the openings in the film must be properly correlated. As to the shape of the openings, openings having sharp corners at which stresses are likely to concentrate, particularly during drawing, should be avoided to minimize tearing of the film. Suitable openings of the simplest shape would, of course, be round, elliptical or rectangular with rounded corners, while openings of more complex configuration may be, for example, hexagonal or octagonal with rounded corners or may be comprised of a number of arcuate surfaces, such as found in a clover-leaf design. As will be more apparent hereafter, the film openings may be formed in various combinations or patterns, so as to provide the finished web or net with desirable qualities from the standpoint of appearance and/or function.

As heretofore mentioned, conventional film stretching apparatus may be employed for orienting the ribs of the perforated film either under cold drawing conditions; that is, at room temperature, or under hot drawing conditions wherein the film is heated to enhance plastic flow without actually rendering the polymeric material completely molten. The drawing conditions, and particularly the temperature of the film during drawing, will of course vary with the particular polymeric material from which the film is formed and, to some degree, with the characteristics desired in the finished net. For example, when drawing a perforated film of polypropylene at elevated temperatures, necking of the ribs, particularly at the draw-line, is less pronounced than that which is achieved under cold drawing conditions. Further, cold drawing procedures are preferred when a finished net having a high covering ratio is desired since under these conditions the major reduction in size of the ribs occurs in the thickness of the rib rather than along its width. It may be added that under cold drawing conditions, the stretched ribs of a film formed of polypropylene become filled with tiny enclosed bubbles or voids which impart an attractive pearlescent or cloudy appearance to the drawn areas and serve to visually indicate the extent to which drawing has occurred.

Drawing of the perforated film may be effected along one or both of its longitudinal and transverse axes. Further, while the ribs in any one group of parallel ribs must be capable of being drawn to substantially the same degree, the groups of parallel ribs in series therewith may be of different cross-sectional size, so that only selected groups of parallel ribs will yield under the applied forces, or of different shape so that the finished net will have ribs of different lengths.

Biaxial stretching of a perforated film can be effected by drawing the film simultaneously or sequentially along its longitudinal and transverse axes. Generally, when stretching of the unoriented film is effected in independent stages, a net of substantially the same character is provided regardless of whether the film is first drawn along its longitudinal or transverse axis. With films having openings of complex configuration specifically such that ribs extend at an angle to both the longitudinal and transverse axes of the film, the order of stretching is important. Generally, films having such complex openings can be satisfactorily stretched when biaxial stretching forces are applied simultaneously to the film. Difficulty arises, however, when it is desired or necessary to stretch such films longitudinally and transversely in independent stages, or where simultaneously applied stretching forces of unequal magnitude are employed. To insure proper drawing in these particular cases, it is essential that the ribs which extend at an angle to the longitudinal and transverse axes of the film yield to the stretching forces before stretching is initiated in certain other ribs of the film. As will be more fully explained hereafter, this desired stretching action of the inclined or angulated ribs is achieved by first stretching the film along an axial direction which extends at an angle of 45° or less to the axes of the inclined ribs. Aside from initiating proper drawing action along desired ribs of the film, the application of simultaneous biaxial stretching forces is also preferred from the standpoint of minimizing the tendency for the inclined ribs to twist and buckle during drawing.

It will be apparent that draw ratios in the longitudinal and transverse directions of the film may be the same or different and will, in general, depend upon the particular polymeric material from which the film is formed, the pattern of openings in the film, and the desired end product. Typical draw ratios may range from 1.5 to 1 up to 20 to 1 or higher in the ribs giving an over all increase of 10% to 1000% or more and an area increase of from 20% to 10,000%.

As heretofore mentioned, the spacing between the openings initially formed in the film is important for the satisfactory practice of the invention and therefore care must be exercised in forming the same. Such openings may be formed by punching or drilling the film or may be formed during the initial casting of the film, as for example, by employing a suitably shaped mold.

In lieu of actually perforating the unoriented film of polymeric material, a modified procedure which has provided satisfactory results is to paint, dye or otherwise coat selected spaced areas of the unoriented film with a black or other heat-absorbing pigment. These coated areas would correspond to openings formed in the film employed in the procedure heretofore described and the spacing, shape and/or size of such coated areas, would be such as to comply with the limitations discussed above. Upon biaxially stretching such film under hot drawing conditions with radiant heating the coated areas would absorb the greatest amount of heat and would therefore offer little resistance to the biaxial stretching forces. The uncoated rib areas would react only to the stretching forces exerted along their respective longitudinal axes and would therefore be uniaxially drawn. As with the perforated film heretofore described, the junctures between the drawn ribs will remain undrawn. Since the heat absorbing capacity of the coated areas will be gradually reduced as such areas are stretched, longitudinal and transverse stretching is preferbly effected in independent stages, with the selected areas being recoated between the separate stretching operations.

As a still further alternative or in combination with last described procedure, a heat reflective material, such as aluminum paint may be applied to the unoriented film of polymeric material in accordance with a predetermined pattern corresponding to the desired arrangement of ribs and undrawn junctures. It will be apparent that upon biaxially orienting of such film under hot drawing conditions, the rib areas coated with the heat reflective material would be heated the least and would undergo uniaxial orientation, while the uncoated areas are drawn along biaxial directions.

For a more detailed description of the invention, reference is made to FIGURE 1 of the drawing which illustrates a portion of an unoriented film of polymeric material 7 having a series of punched circular openings 9. To simplify the description, the openings are all of the same diameter $d$ and are uniformly spaced longitudinally and transversely of the film 7, as indicated at S. The elements or ribs of the film which are capable of being drawn or oriented as the film is stretched extend between adjacent openings, as indicated for example by the shaded areas RA and RB in FIGURE 1, and are each formed with a narrow part WA and then widen out at its opposite ends to a width WB.

With the openings 9 being spaced to provide the ribs with a width ratio $(WB)/(WA)$ which is substantially equal to the yield to draw ratio of the particular polymeric material employed, stretching of the film 1 longitudinally, as indicated by the arrows 11, causes the groups of parallel ribs RA to be sequentially drawn, with the drawing of one group of parallel ribs being substantially completed before drawing is initiated in a group of parallel ribs RA in series therewith. During this stretching operation, the individual ribs RA initially yield at their narrowest part WA, as shown at 13 in FIGURE 2, and then continue to be progressively drawn in opposite directions therefrom as illustrated at 15 in FIGURE 3. As this drawing action proceds it extends into the wider portions of the individual ribs and the stretching load applied to the film 7 is progressively increased until the ribs RA are drawn to substantially their widest parts WB, as shown in FIGURE 4. At this stage the applied stretching load is at least equal to or exceeds the load under which an adjacent series of undrawn ribs RA start to yield so that further stretching of the drawn ribs ceases while drawing is initiated and continued in the undrawn ribs in series therewith. It will be noted that under these conditions, the drawing action is self-regulating in that the load required to continue drawing of a rib beyond its widest part; that is beyond its allowable maximum extent, is greater than the load under which an adjacent undrawn rib will yield at its narrowest part.

After being uniaxially stretched as described above, the film 7 appears as shown in FIGURE 5 wherein the original openings 9 have been deformed into elongated slots 17 and the groups of parallel ribs RA extending between such openings are longitudinally drawn, as indicated by shading. Upon applying an equal transverse stretching load to the film shown in FIGURE 5, as indicated by arrows 19, the ribs RB are drawn in the same manner as described above to provide a finished reticulated structure or net 21 as shown in FIGURE 6. It will be noted that the drawn ribs terminate at points along the periphery of the enlarged openings which are at substantially 45° to either axis of the film, and that the terminal portions of the drawn ribs RA and RB between adjacent pairs of openings define a juncture 23 in which no orientation has been effected. These undrawn junctures, as heretofore explained, assist in maintaining the independent longitudinal and transverse drawing forces confined to the respective ribs RA and RB and also serve to make the net 21 more resistant to tearing.

As heretofore mentioned, the ribs RA and RB may be each drawn to their maximum allowable extent in two separate stretching operations, the latter of which is applied, in each case, after the initial stretching of all of the respective ribs RA and RB is completed. In this case, the openings 9 are positioned closer to each other than in the arrangement described above to provide ribs RA and RB with a width ratio $(WB)/(WA)$ which is greater than the ratio of the yield load to draw load but at least slightly less than the breaking load to drawing load ratio of the particular polymeric material employed. Thus, during the initial stretching operation, yielding is initiated in each group of parallel ribs before the ribs in series therewith are drawn to their maximum allowable extent. Once initial stretching of all of the respective ribs RA and RB is completed, the film 7 may be then subjected to further stretching to thereby draw the ribs to the desired degree. It will be apparent that with ribs RA and RB having a width ratio $(WB)/(WA)$ which approaches the breaking load to the drawing load ratio, the load required to effect the maximum allowable drawing in the respective ribs during the second stretching operation will be slightly less than the load under which such drawn ribs would break. Thus, under these conditions maximum orientation and therefore optimum strength is imparted to respective ribs.

To better illustrate the method of the present invention, reference is made to the following examples:

Example 1

With the aid of a template an unoriented film of polypropylene of .010 inch in thickness was provided with a pattern of circular openings, as shown in FIGURE 1 of the drawing, wherein $d=0.60$ cm. and $S=1.0$ cm. The ribs formed between adjacent openings were each of a width WA at their narrowest section and widened out to a width WB as follows:

$$WA = S - d = 0.4 \text{ cm.}$$
$$WB = S - d \cos 45° = 0.58 \text{ cm.}$$

The ratio of the wide portion of the individual ribs to the narrowest portion thereof was $$WB/WA = 0.58/0.4 = 1.45$$

The above described perforated film was cold drawn in independent stages along its longitudinal and transverse axes, with the draw ratio within the ribs being 6 to 1 in each direction. In each group of parallel ribs, drawing initiated at narrowest portions of the individual ribs (in this case the midsection of the respective ribs) and progressed in opposite directions therefrom until a drawline was reached which was approximately 1.4 times as long as the initial width of the rib at its narrowest section. To continue this drawing action beyond the desired draw lines and into the junctures between the ends of adjacent ribs would require a load of about 1.45 as large as the load applied in drawing the rib after it had initially yielded. Since the undrawn ribs in series with the drawn load started to draw under a load of about 1.4 times the drawing load, it was not possible under the above condition to exert a drawing influence on the junctures between the ends of adjacent ribs, except by subjecting the film to a second drawing operation once all the ribs have been stretched as described above.

In the finished structure, the uniaxially drawn ribs had a thickness of .0025 inch and a length of 2.54 cm. The undrawn junctures between the ends of adjacent ribs of course maintained their original thickness and measured about .58 cm. along each side; that is, along the respective draw-lines. Thus, the original 1 cm. center-to-center spacing of the film openings was increased to 3.12 cm. in the finished net.

*Example 2*

A film as employed in Example 1 was perforated with circular openings of a diameter $d$ of .8 cm. which were spaced on center-to-center distances S of 1.0 cm. in both the longitudinal and transverse directions. At their narrowest section the individual ribs had a width WA of 0.20 cm. The ribs widened out to a width WB of .44 cm. at their ends, as measured along a line drawn between points located on the peripheries of adjacent openings at 45° to film axes. The ratio of the widths of the respective ribs was $$WB/WA=2.2$$

The above perforated film was stretched as described in Example 1. The yield load of the individual undrawn ribs was about 1.4 times the load required to maintain drawing thereof once such rib started to stretch, while the load necessary for exerting a drawing action on the ribs to the junctures was about 2.2 times such drawing load. Thus, during an initial drawing operation, the ribs of each group of parallel ribs were only partially drawn when the ribs in series therewith started to yield.

Once all the ribs had been stretched, a load slightly less than the breaking load of the drawn ribs was applied to the film to exert further drawing of the partially drawn ribs to approximately their allowable maximum extent.

*Example 3*

A film as employed in Example 1 was provided with openings having a diameter $d$ of 0.3 cm. which were spaced at center-to-center distances S of 1.0 cm. The ribs formed between openings had a width WA of 0.7 cm. and a width WB of 0.79 cm. The ratio of width $WB/WA$ was equal to 1.1.

As in the previous examples the yield load of the undrawn ribs was equal to about 1.4 times the load required to maintain drawing once the rib had started to stretch. The load required to effect maximum drawing of the individual ribs, however, was equal about 1.1 times the draw load. Under these circumstances stretching of the undrawn ribs was initiated only after the drawing action exerted on the previously drawn ribs progressed into the junctures between the ends of adjacent ribs.

Figure 8:
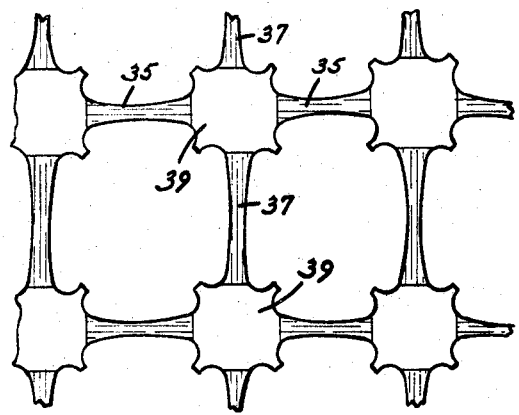
FIGURE 8 is a top view of the film shown in FIGURE 7 after being biaxially stretched.

As heretofore mentioned, the method of the present invention is adapted for providing reticulated structures or nets having different functional and/or decorative characteristics by varying the shape and/or relative spacing of the openings initially formed in the unoriented polymeric film. As shown in FIGURE 7, for example, an unoriented film 31 of thermoplastic polymeric material may be provided with openings 33 of generally cloverleaf configuration which are spaced in accordance with the limitations as previously described. Upon stretching of the unoriented perforated film 31 substantially equal amounts along biaxial directions, either simultaneously or in independent stages by either a single or multiple stage stretching operation as heretofore described, the individual longitudinally and transversely extending film portions between adjacent openings 33 are drawn to provide uniaxially oriented ribs, such as shown at 35 and 37 in FIGURE 8, which are separated by undrawn film portions or junctures 39 of rather complex shape.

Figure 9:
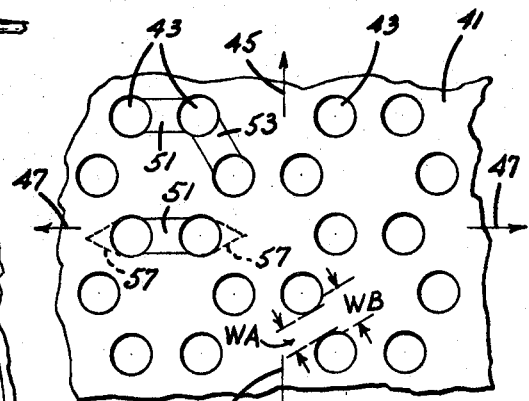
FIGURE 9 is a view similar to FIGURE 7 showing a portion of an unoriented film having openings disposed in a hexagonal array.

Referring now to FIGURE 9 of the drawing, the unoriented film 41 of thermoplastic polymeric material there illustrated is provided with openings 43 disposed generally in a hexagonal array; that is, with each opening 43 located at a corner of a hexagonal pattern.

Figure 10:
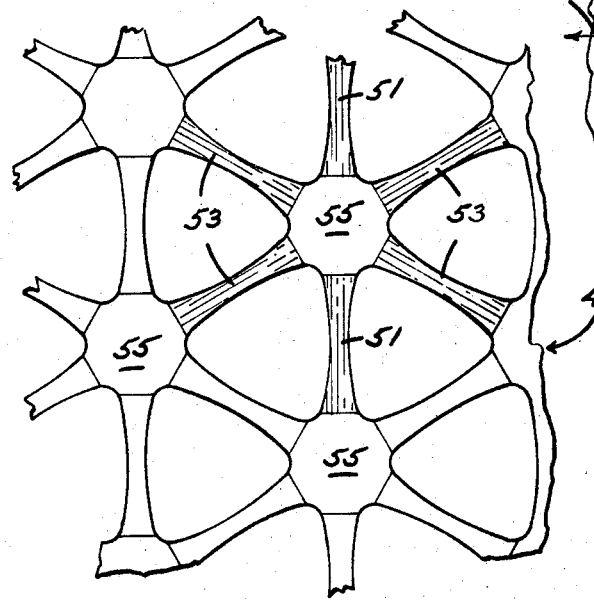
FIGURE 10 is a top view of the film shown in FIGURE 9 after being biaxially stretched.

Upon simultaneously applying equal biaxial stretching forces, to the perforated film 41, as indicated by the arrows 45 and 47 extending along the longitudinal and transverse film axes respectively, a net 49 is provided as shown in FIGURE 10.

In the particular pattern of openings formed in the film 41, the spacing between each pair of adjacent openings is the same so that the narrow part of each rib, as measured along a line extending between the centers of adjacent pairs of openings is equal to the corresponding parts of the other ribs. With ribs which extend generally parallel to either axis of the unoriented film, such as the ribs 51, yielding will initially occur in the narrowest part of the rib along a line which is substantially perpendicular to the direction of the applied stretching force. The inclined ribs; that is, the ribs which extend at an angle to both axes of the film, such as the ribs 53, will react likewise by yielding along a line which extends generally perpendicular to the direction of the applied stretching force. As with the previously described structures, the net 49 includes a plurality of uniaxially drawn ribs 51 and 53 which are separated at their ends by undrawn film portions or junctures 55. It will be noted, however, that the ribs 53 are uniaxially oriented notwithstanding the fact that they are inclined or extend angularly with respect to the longitudinal and transverse axes of the film.

The simultaneous application of biaxial stretching forces to an unoriented film having a complex pattern of openings is preferred from the standpoint of minimizing buckling of the inclined ribs as they are drawn, and to insure that such inclined ribs are properly stretched. It is possible, however, to form the net 49 by stretching the perforated film 41 in independent stages, providing that the direction of the first applied stretch is in accordance with the requirements heretofore described. With a perforated film as shown in FIGURE 9, the application of a stretching force first in the direction of arrows 45 would initiate drawing along the film portions or ribs indicated at 51. The influence of this stretching force extends also into the film portions indicated at 57 which would thus have a tendency to stretch in parallel relationship with the ribs 51. This would lead to buckling and constitute an undesired drawing of the joint.

On the other hand, by first stretching the perforated film 41 in the axial direction as indicated by arrows 47, only those film ribs which extend at an angle of less than 45° to the applied stretching force are each drawn into a form as shown at 53. As such film is subsequently stretched in the direction of arrows 45, the film portions 51 are drawn to provide the construction as shown at FIGURE 10. During this last-mentioned stretching operation, the previously drawn ribs 53 are slightly twisted so that no drawing is occasioned within the film junctures 55.

The thickness of the unoriented thermoplastic polymeric film initially employed will depend primarily upon the characteristics desired in the finished reticulated structure and upon the capacity of the stretching equipment available, rather than the steps of the method described. Of particular importance in the embodiment of the invention in which selected areas of the unoriented film are treated with a heat reflecting and/or heat absorbing medium, the film should be sufficiently thick to facilitate biaxial stretching of certain areas thereof without film rupture. On the other extreme, films of one-eighth inch in thickness and more have been satisfactorily processed in accordance with the method described, with only the ability of the stretching equipment serving as a practical limitation.

While films of polypropylene have been mentioned specifically in the description, it will be apparent that the method of the present invention may be practiced on films formed of any thermoplastic polymeric material which can be readily oriented with known stretching apparatus.

The reticulated structures or net formed in accordance with the present invention are adapted for various uses. For example, the finished net may be employed in fishing or athletic equipment, as a screen or in filter packs, as a reinforcement for laminated webs of different types, as a decorative and/or structural material in apparel, as a support in lawn furniture, or in forming lightweight bags and other containers. The unperforated reticulated structure, on the other hand, is particularly suited as a lightweight protective structure, such as in tents, as a wrapping material, in balloons and buoys, etc.

It is to be understood that changes and variations may be made without departing from the spirit and scope of the invention as defined in the appended claims.

I claim:

1. A generally flat structure formed of thermoplastic polymeric material having a plurality of uniaxially drawn ribs which are separated from each other by undrawn portions.

2. A web of thermoplastic polymeric material having a plurality of ribs, certain of said ribs extending along directions generally parallel to the longitudinal axis of said web and at least some of the remainder of said ribs extending generally parallel to the transverse axis of said web, at least certain of the ribs which are parallel to one of said axes being uniaxially drawn and terminating at undrawn web portions.

3. A web of thermoplastic polymeric material having a plurality of ribs, certain of said ribs extending along directions generally parallel to the longitudinal axis of said web and at least some of the remainder of said ribs extending generally parallel to the transverse axis of said web, at least certain of the ribs which are parallel to said respective axes being uniaxially drawn and terminating at undrawn web portions.

4. A web as defined in claim 3 wherein the portions of the web extending between sides of adjacent drawn ribs are oriented along biaxial directions.

5. A web as defined in claim 3 wherein adjacent parallel ribs are separated by an opening extending through said web.

6. A web of thermoplastic polymeric material having a plurality of ribs, at least certain of said ribs being uniaxially drawn and terminating at undrawn web portions, and wherein lines defining the ends of drawn ribs terminating at common undrawn web portions do not intersect with each other.

7. A method for making a reticulated web including the steps of treating an unoriented film of thermoplastic polymeric material at selected spaced areas to render such areas more responsive to stretching forces than other film areas and to shape the film portions between adjacent treated areas into ribs each having a narrow part and being wider at its ends, said treated areas being spaced so that the ratio of the widest and narrowest parts of said ribs is at least equal to the ratio required to initiate the drawing of such ribs and the load necessary for maintaining the drawing after such ribs have yielded and stretching the film at least along one of its axial directions to uniaxially draw at least certain of said ribs along substantially their entire length without inducing stretching in the film portions between the ends of adjacent ribs.

8. A method as defined in claim 7 wherein the ribs which draw parallel with each other as the film is stretched are shaped to permit the same to stretch to substantially the same degree.

9. A method as defined in claim 7 wherein the ribs which draw in series with each other as the film is stretched are of comparable cross-section whereby such ribs will stretch progressively along the film, with stretching being initiated in one of such ribs before a drawn rib in series therewith is drawn to its breaking point.

10. A method for making a non-woven net including the steps of providing an unoriented film of thermoplastic polymeric material with openings to shape the film areas between openings into the form of ribs each having a narrow part and being of greatest width at its ends, said openings being spaced so that the ratio between the widest and narrowest parts of said ribs is at least equal to the ratio between the load required to initiate drawing of such ribs and the load necessary for maintaining such drawing once the ribs have yielded, and stretching the film at least along one of its axial directions to enlarge said openings and uniaxially draw at least certain of said ribs along their lengths without inducing stretching in the film portions between the ends of adjacent ribs.

11. A method as defined in claim 10 wherein said film is stretched along biaxial directions and wherein lines defining the ends of drawn ribs which terminate at common undrawn film portions do not intersect with each other.

12. A method as defined in claim 10 wherein the ratio between the widest and narrowest parts of said ribs is greater than the ratio between the yield and drawing loads but less than the ratio between the load which would cause rupture of the drawn ribs and the drawing load.

13. A method as defined in claim 12 wherein said selected ribs are uniaxially drawn substantially along their entire lengths without inducing stretching in the film portions between the ends of adjacent ribs in two independent stretching operations, the latter of which being effected after completion of initial stretching of all of such ribs.

14. A method for making a reticulated web including the steps of treating selected areas of an unoriented thermoplastic polymeric film with a heat absorbing material to shape the film areas between the treated areas into the form of ribs each having a narrow part and being of greater width at its ends, said treated areas being spaced so that the ratio between the widest and narrowest parts of said ribs is at least equal to the ratio between the load required to initiate drawing of such ribs and the load necessary for maintaining such drawing once the ribs have yielded, heating the film to enhance plastic flow without rendering the film molten, and stretching the heated film along its longitudinal and transverse axes to biaxially orient the treated areas thereof and to uniaxially orient at least certain of said ribs substantially along their entire length without inducing stretching in the film portions between the ends of adjacent ribs.

15. A method as defined in claim 14 wherein said ribs of the unoriented film are coated with a heat-reflective material to provide for a greater thermal differential between said ribs and treated areas as the film is heated and stretched.

16. A method for making a reticulated web including the steps of treating an unoriented thermoplastic polymeric film with a heat-reflective material along areas spaced longitudinally and transversely of the film and intersecting with each other whereby the treated areas between adjacent untreated areas are in the form of ribs each having a narrow part and being of greater width at its ends, said untreated areas being spaced so that the ratio between the widest and narrowest parts of said ribs is not less than the ratio between the load required to initiate drawing of such ribs and the load necessary for maintaining such drawing over the ribs have yielded, heating the film whereby the plastic flow characteristics of the uncoated areas are enhanced without rendering the same molten, and stretching the heated film along its longitudinal and transverse axes to biaxially orient the untreated areas thereof and to uniaxially orient at least certain of said ribs substantially along their entire length without inducing stretching in the film portions between the ends of adjacent ribs.

References Cited

UNITED STATES PATENTS

| | | | |
|---|---|---|---|
| 2,919,467 | 1/1960 | Mercer | 156—167 |
| 2,582,777 | 1/1952 | Grozinger | 161—109 |
| 3,051,987 | 9/1962 | Mercer | 156—229 |
| 2,079,584 | 5/1937 | Hazell et al. | 161—109 |
| 2,866,231 | 12/1958 | Vaughan. | |
| 2,968,065 | 1/1961 | Gronholz. | |

FOREIGN PATENTS 254,139   11/1950   Japan.

OTHER REFERENCES

"Plastic Net by Extrusion," Plastics, Temple Press Ltd., London, 23, No. 244, p. 5 (January 1958), TP 986 ALP62 161/Plastic Net.

Mason and Manning, The Technology of Plastics and Resin, New York, Van Nostrand, 1945 (pp. 131–133).

ROBERT F. BURNETT, *Primary Examiner.*

EARL M. BERGERT, ALEXANDER WYMAN,
*Examiners.*

R. I. SMITH, W. J. VAN BALEN, *Assistant Examiners.*